United States Patent

[11] 3,619,458

| [72] | Inventor | Jean Alfred Engelhardt<br>Lyon, France |
|---|---|---|
| [21] | Appl. No. | 814,231 |
| [22] | Filed | Mar. 26, 1969 |
| [45] | Patented | Nov. 9, 1971 |
| [73] | Assignee | Societe Anonyme dite: Cefilac<br>Paris, France |
| [32] | Priorities | July 28, 1964 |
| [33] | | France |
| [31] | | 45,018;<br>May 4, 1965, France, No. 45,949<br>Continuation-in-part of application Ser. No. 475,111, July 25, 1965, now abandoned. |

[54] METHOD OF MAKING A GASKET
3 Claims, 5 Drawing Figs.

[52] U.S. Cl. ..................................................... 264/260,
264/328, 264/275
[51] Int. Cl. ............................................... B29f 1/06
[50] Field of Search ........................................... 264/259,
260, 328, 275

[56] References Cited
UNITED STATES PATENTS

| 2,351,329 | 6/1944 | Gerstenmaier | 264/260 X |
| 2,732,613 | 1/1956 | Renholts | 264/328 X |
| 2,841,863 | 7/1958 | Geisler | 264/328 X |
| 2,940,128 | 6/1960 | Bowerman | 264/328 X |
| 3,350,252 | 10/1967 | Twickler | 264/254 X |

*Primary Examiner*—Robert F. White
*Assistant Examiner*—Richard R. Kucia
*Attorney*—Holcombe, Wetherill and Brisebois ABSTRACT: A method of providing an apertured gasket support with a ring of sealing material encircling said aperture, using a pair of mold parts, each of which has an annular recess in one face thereof connected to a sealing material reservoir, the inner diameter of the recess being greater than that of the aperture, according to which one mold part is positioned on each side of said gasket support with the recesses and aperture aligned and the inner edge of each recess spaced from the edge of the aperture and injecting liquid sealing material into both recesses, while simultaneously clamping the gasket support between the mold parts.

PATENTED NOV 9 1971　3,619,458

INVENTOR
JEAN ALFRED ENGELHARDT
BY Holcombe, Wetherill & Brisebois
ATTORNEYS

INVENTOR
Jean Alfred Engelhardt

METHOD OF MAKING A GASKET

This is a continuation-in-part of Ser. No. 475,111 filed July 25, 1965, now abandoned.

SUMMARY OF THE INVENTION

The present invention relates to a method of making novel gaskets and more particularly to cylinder head gaskets for motors.

The gaskets in question are characterized by the fact that they comprise a generally flat support provided with apertures and that the peripheries of these apertures are sealed by continuous ribs made of an elastomeric material which are located on both sides of the support at a certain distance from the edges of the apertures.

The base support may consist of a sheet of metal or any other material, or may be assembled from a plurality of component parts.

According to a preferred method of carrying out the invention, the ribs made of elastomeric material are formed around the peripheries of the apertures, but the elastomeric material does not cover the edges of the apertures.

The cross section and arrangement of the ribs are such that once the gasket is tightened between the 2 parts it is intended to join, the joint is effectively sealed.

Thus, when the joint according to the invention comprises a gasket for a cylinder head used in an internal combustion engine, the ribs are positioned around the apertures corresponding to the passage for the cooling liquid and to the passage for the lubricating oil.

The ribs can either be single or multiple; in the latter case, fluid-tightness is achieved by using at least two parallel ribs placed side by side at a certain distance from each other.

The ribs can be made out of any appropriate elastomer, for instance, silicone.

In one particular way of using the gaskets made by the process according to the invention, when they are especially intended for motors of the type having a "compressed jacket" and when the cylinder block and the cylinder head are made of a light alloy, fluid-tightness around each aperture is achieved by providing ribs connected to the base by a common base plate the thickness of which can for instance, be the same as the height of the ribs relative to this base. As a consequence of this particular arrangement, when the joints are tightened, the ribs are crushed in such a way that they become completely absorbed into the base plate.

It may be deduced from this fact that cylinder head gaskets of this type have a very high capacity for deformation, which characteristic is much sought after for the above-mentioned motors.

The present invention covers a process for manufacturing the joints described above and this process is characterized by the fact that at the same time and independently from each other, the ribs placed on both faces of the support may be formed by injecting the elastomer, initially held in reserve from cylinders placed on either side of the side of the base by reducing the volume of said cylinders.

The invention will now be described with reference to the accompanying drawings, in which.

Figure 1:
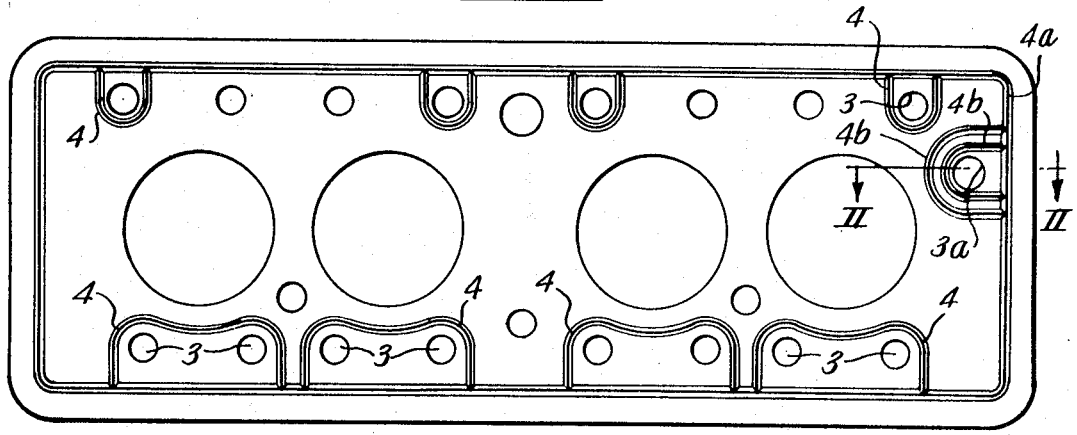
FIG. 1 is a top view of a gasket according to the invention.

On FIG. 1, a gasket 2 has been shown; its general appearance as well as the position and size of the apertures are determined independently of the invention according to the type of engine for which it is intended.

Reference numeral 3 indicates the apertures. The peripheries of these apertures are sealed according to the invention by ribs 4 which are located symmetrically on each face of the support 1, as can be seen especially on FIG. 2, which is a cross section on a larger scale of a part of the cylinder head gasket shown on FIG. 1.

Figure 2:
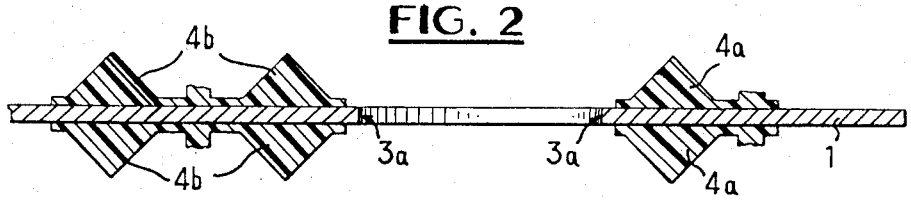
FIG. 2 is a cross-sectional view on a larger scale, taken along the line II–II of FIG. 1.

FIG. 2 shows that aperture 3 is surrounded on the one hand by the plain ribs 4a and, on the other hand, by the double ribs 4b.

It should be noted that, according to one of the preferred characteristics of the invention, the edges 3a of aperture 3 are not covered by the elastomer forming the ribs 4a and 4b.

Figure 3:
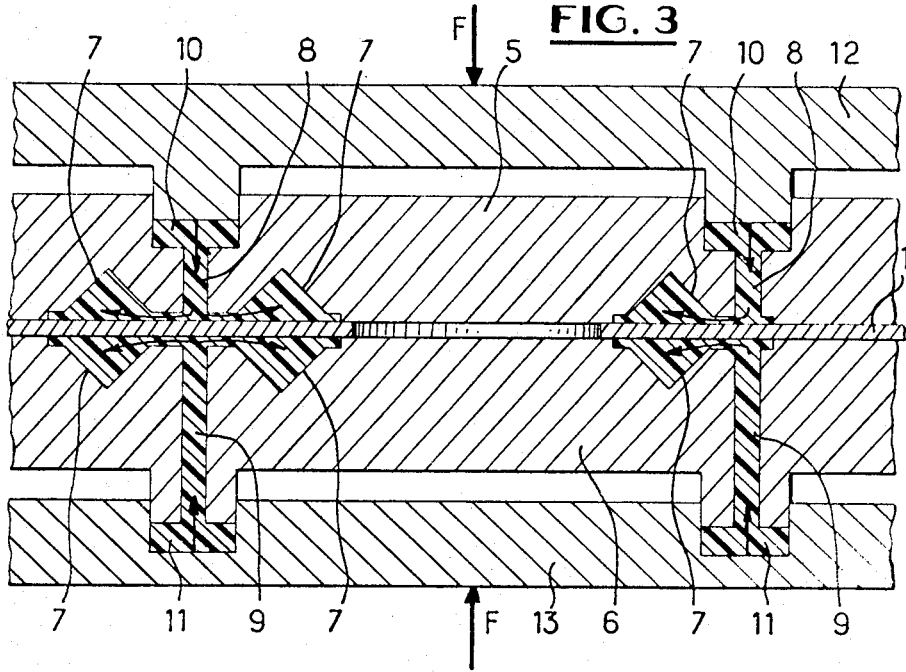
FIG. 3 shows in cross section how a joint according to the invention may be molded.

FIG. 3 shows in a schematic way how the cylinder head gasket which has just been described can be manufactured.

There can be seen on this drawing the shells 5 and 6 of the mold which encompass the support, leaving hollow spaces 7 for the forming of the ribs.

These spaces are connected by channels 8 and 9 respectively to cylinders 10 and 11 defined by the shells 5 and 6 and the counterplates 12 and 13.

In order to produce a gasket according to the invention the required quantity of elastomer is inserted into cylinders 11 of the counterplate 13, after which the lower shell 6 is placed in position on the counterplate and base 1 set in the proper position on the shell 6.

Upper shell 5 is then positioned on base 1 and the necessary quantity of elastomer is inserted in cylinders 10, after which the upper counterplate 12 is applied and pressure exerted in the direction of the arrows F in FIG. 3, the elastomer moving from cylinders 10 and 11 in the direction of the arrows in order to form the ribs. This elastomer is afterwards vulcanized by the action of the heat released by the heating press.

It will be noted that, due to the process according to the invention, it is possible to cast the ribs without using any complicated preliminary casting shape made of elastomer, as the casting process leaves only small protuberances (clearly shown on FIG. 2) corresponding to the base portions of channels 8 and 9, and they are not detrimental to the fluid-tightness of the gasket.

These protuberances can advantageously be positioned either between two ribs as is the case on the left side of FIG. 2, or next to the rib shown on the right of the same figure.

Figure 4:
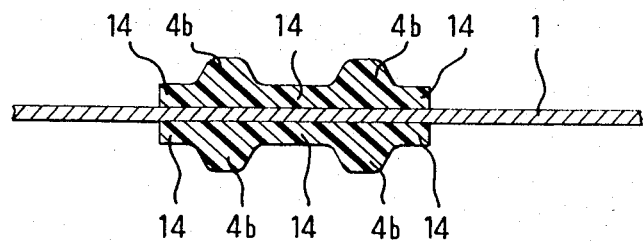
FIG. 4 and FIG. 5 show a preferred embodiment of the ribs of the gasket according to the invention, FIG. 4 in the free state, and FIG. 5 after compression between an engine block and the cylinder head.

A particular way of forming the ribs is represented in cross section on FIG. 4.

This figure shows the support 1 as well as two ribs 4b which are parallel to each other and connected to support 1 by means of a base 14, the thickness of which is relatively large, for instance of the same order as the height of the ribs 4b relative to the surface of this base 14.

Figure 5:
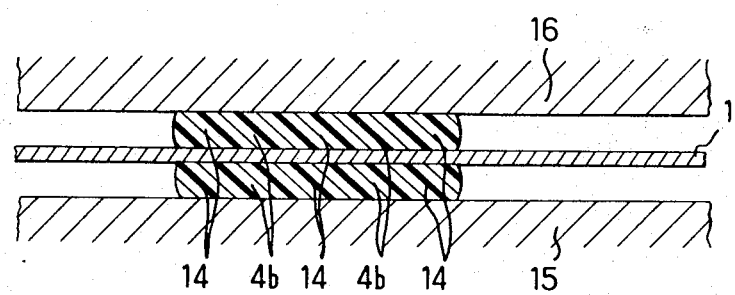

FIG. 5 shows how the gasket shown in FIG. 4 becomes deformed when it is tightened between an engine block 15 and its cylinder head 16.

It will be noted that, after tightening, the ribs 4b, have been completely driven into the base 14, due to the great deformability of the elastomer used.

We claim:

1. A method of providing an apertured gasket support with a ring of sealing material encircling said aperture, which method utilizes a pair of mold parts, each mold part having an annular recess in one face thereof connected to a sealing material reservoir, the inner diameter of said recess being greater than that of said aperture, and which method comprises the steps of positioning 1 of said mold parts on each side of said gasket support with the recess in each mold part facing the gasket and aligned so that the inner edge of each recess is spaced from the edge of said aperture, locating a counterplate near the face of each mold part away from said gasket support so that movement of each counterplate toward and away from its respective mold part moves a wall of the reservoir in said respective mold part to vary the volume of that reservoir, bringing said counterplates together to reduce the volume of said reservoirs, so as to simultaneously inject said sealing material into the recesses in both mold parts, while simultaneously pressing said mold parts against said support.

2. The method claimed in claim 1 in which said mold parts are heated to vulcanize the sealing material in said recesses while said mold parts remain in contact with said gasket support.

3. The method claimed in claim 1 according to which said mold parts clamp therebetween the portion of said gasket support lying between the edge of said aperture and the inner edge of said recesses while said sealing material is being injected.

* * * * *